US009313740B2

(12) United States Patent
Wadman et al.

(10) Patent No.: US 9,313,740 B2
(45) Date of Patent: Apr. 12, 2016

(54) POWER EFFICIENT SENSOR ACCESSORY MANAGEMENT THROUGH SENSOR SUBSYSTEM

(71) Applicant: Sony Corporation, Tokyo (JP)

(72) Inventors: Johan Wadman, Lund (SE); Peter Ljung, Lund (SE)

(73) Assignee: Sony Corporation, Tokyo (JP)

( * ) Notice: Subject to any disclaimer, the term of this patent is extended or adjusted under 35 U.S.C. 154(b) by 154 days.

(21) Appl. No.: 13/918,032

(22) Filed: Jun. 14, 2013

(65) Prior Publication Data
US 2014/0370941 A1   Dec. 18, 2014

(51) Int. Cl.
*H04W 52/02*   (2009.01)

(52) U.S. Cl.
CPC ...... *H04W 52/0235* (2013.01); *H04W 52/0254* (2013.01); *H04W 52/0261* (2013.01); *H04W 52/0293* (2013.01); *Y02B 60/50* (2013.01)

(58) Field of Classification Search
CPC .............. H04W 52/0235; H04W 52/0261
See application file for complete search history.

(56) References Cited

U.S. PATENT DOCUMENTS

| | | | | |
|---|---|---|---|---|
| 8,843,173 B2 * | 9/2014 | Lee | | G06F 1/3206 345/158 |
| 8,892,162 B2 * | 11/2014 | Garrone | | H04M 1/72563 345/156 |
| 2012/0100895 A1 | 4/2012 | Priyantha et al. | | |
| 2012/0254878 A1 | 10/2012 | Nachman et al. | | |
| 2013/0117769 A1 | 5/2013 | Sharma et al. | | |
| 2014/0349692 A1* | 11/2014 | Zhou | | G06Q 20/3829 455/466 |

FOREIGN PATENT DOCUMENTS

| WO | WO 2010/141878 A1 | 12/2010 |
|---|---|---|
| WO | WO 2011/022504 A1 | 2/2011 |

OTHER PUBLICATIONS

Lin et al. "Transparent Programming of Heterogeneous Smartphones for Sensing", Technical Report 0310-2011, 15 pages.
Lin et al. "Reflex: Using Low-Power Processors in Smartphones Without Knowing Them" ASPLOS'12, Mar. 3-7, London, England, UK, 12 pages.
Lin et al. "Dandelion: A Framework for Transparently Programming Phone-Centered Wireless Body Sensor Applications for Heath", Wireless Health '10, Oct. 5-7, 2010, San Diego, USA, 10 pages.
European Search Report Corresponding to European Patent Application No. 14 168 226; Dated: Sep. 3, 2014; 7 Pages.
International Search Report and Written Opinion Corresponding to International Application No. PCT/JP2014/002520; Date of Mailing: Sep. 3, 2014; 11 Pages.

* cited by examiner

*Primary Examiner* — Bobbak Safaipour
(74) *Attorney, Agent, or Firm* — Myers Bigel & Sibley, P.A.

(57) ABSTRACT

Application instructions for a sub-system processing unit are received through an application programming interface (API). The application instructions control a sub-system processing unit to process wireless messages directed to a main processing unit. A message rule may be generated based on the received application instructions and predefined conditions and actions stored in the sub-system processing unit. Responsive to receiving the wireless messages from sensors and/or tags external to the wireless terminal, an action may be performed at the sub-system processing unit according to the generated message rule to control and/or reduce processing of the wireless messages by the main processing unit.

18 Claims, 7 Drawing Sheets

POWER EFFICIENT SENSOR ACCESSORY MANAGEMENT THROUGH SENSOR SUBSYSTEM

FIELD

This invention relates to processing messages from sensors and/or tags.

BACKGROUND

A sensor coupled to a short-range Radio Frequency (RF) device may provide wireless sensor signals to a mobile electronic device, such as a smartphone. Short-range RF wireless signals may include, for example, WiFi, Bluetooth® signals (e.g., Bluetooth 4.0) or ANT (e.g., ANT+) radio protocols. Short-range RF wireless signals may also include Near Field Communications (NFC) or Radio Frequency Identification (RFID) protocols, among other examples.

Information from internal and external sensors may need to be processed continuously. For instance, in outdoor fitness applications the sensors may be activated continuously (at least during exercise). Other applications may use context awareness sensors that must be active at all times to measure the context.

Power consumption is a large concern for these types of applications. Frequent activation of the main central processing unit (CPU) of a mobile device enacts great costs on the battery of the device. There is a lot of overhead because the main CPU draws a lot of power just to reach a ready state. If this happens too often, the power consumption may be too high.

To mitigate heavy CPU use, some systems utilize a sub-system CPU for internal sensors, which takes over some sensor message processing on behalf of the main CPU. However, such systems do not handle frequent wireless messages from external sensors. Such a need has not existed because of standardized and well defined connected setups. Also, paired connections have been used. Furthermore, wireless sensors and an "internet of things" introduce more communications to be handled.

Some sub-systems are inflexible and can only buffer messages. Other systems may utilize additional layers of programming over the mobile device radio component and/or the sensors. However, such systems are very complicated to implement and do not guard against module crashes (memory overwrites, illegal operations, indefinite loops, etc.) in the sub-system. Also, such systems may require that additional programming be pushed out to the sensors.

BRIEF SUMMARY

Embodiments described herein may provide for power efficient management of connection-less, low power radio accessories through a low power CPU sub-system in wireless terminals.

According to some embodiments, a computer-implemented method of controlling a sub-system processing unit of a wireless terminal that coordinates processing with a main processing unit of the wireless terminal. The method may comprise receiving application instructions for the sub-system processing unit through an application programming interface (API). The application instructions control the sub-system processing unit to process wireless messages directed to the main processing unit. The method may also comprise generating a message rule based on the received application instructions and predefined conditions and actions stored in the sub-system processing unit. Responsive to receiving the wireless messages from sensors and/or tags external to the wireless terminal, the method may comprise performing an action at the sub-system processing unit according to the generated message rule to reduce processing of the wireless messages by the main processing unit.

In further embodiments, the application instructions are received while the wireless terminal is powered on and activated for receiving wireless sensor signals.

In some embodiments, the method may comprise selectively buffering the received wireless messages in a buffer based on content of the wireless messages and providing the wireless messages from the buffer to the main processing unit for processing based on the buffer reaching a threshold level.

In other embodiments, the method may comprise withholding provision of a wireless message to the main processing unit based on the message rule or content of the wireless message. The method may comprise withholding provision of a wireless message to the main processing unit when location information of a sensor that sent the wireless message is not found in the wireless message.

In some embodiments, the method may comprise modifying a wireless message based on content of the wireless message and providing the modified wireless message to the main processing unit such that the main processing unit performs less processing of the wireless message than if the wireless message was not modified.

In some embodiments, the method may comprise providing a pre-defined message to an external sensor according to the message rule.

In other embodiments, the method may comprise forwarding wireless messages to the main processing unit at specified times and/or a specified frequency according to the message rule.

In some embodiments, the method may comprise filtering the wireless messages according to the message rule to prevent filtered wireless messages from being processed by the main processing unit.

In other embodiments, the method may comprise generating the message rule based on an operating state of the main processing unit In further embodiments, the method may comprise activating the main processing unit according to the message rule such that the main processing unit is activated less than without the message rule.

In other embodiments, the method may comprise analyzing the characteristics of the sub-system and main processing units and generating the message rule based on the analyzing. The received application instructions and the predefined conditions and actions such that the message rule optimizes the use of the main processing unit according to the analyzed characteristics of the sub-system and main processing units.

In some embodiments, the method may comprise detecting a pattern from a combination of the wireless messages of the same type.

In some embodiments, the method may comprise detecting a pattern of content of the wireless messages defined by the application instructions and the predefined conditions and actions and selectively providing wireless messages to the main processing unit according to a message rule developed for the detected pattern.

In some embodiments, the method may comprise summarizing content of a plurality of the wireless messages into summarized content in a summarized wireless message, providing the summarized wireless message to the main processing unit and discarding the remaining wireless messages of the plurality of wireless messages such that the remaining wireless messages are not provided to the main processing unit.

According to some embodiments, a wireless terminal component may comprise a sub-system processor and a memory coupled to the sub-system processor and comprising computer readable program code embodied in the memory that when executed by the sub-system processor causes the sub-system processor to perform operations. The operation may comprise receiving application instructions through an application programming interface (API). The application instructions control the sub-system processor to process wireless messages directed to a main processor of the wireless terminal. The operations may also comprise generating a message rule based on the received application instructions and predefined conditions and actions stored in the sub-system processor. Responsive to receiving wireless messages from sensors external to the wireless terminal, the operations may comprise performing an action according to the generated message rule to control processing of the wireless messages by the main processing unit.

In some embodiments, the operations of the wireless terminal component may comprise selectively buffering the received wireless messages in a buffer based on content of the wireless messages and providing the wireless messages from the buffer to the main processing unit for processing based on the buffer reaching a threshold level.

In further embodiments, the operations of the wireless terminal component may comprise withholding provision of a wireless message to the main processing unit based on content of the wireless message.

In other embodiments, the operations of the wireless terminal component may comprise modifying a wireless message based on content of the wireless message and providing the modified wireless message to the main processing unit such that the main processing unit performs less processing of the wireless message than if the wireless message was not modified.

In some embodiments, the operations of the wireless terminal component may comprise generating the message rule based on an operating state of the main processing unit.

In some embodiments, the operations of the wireless terminal component may comprise forwarding wireless messages to the main processing unit at specified times and/or a specified frequency according to the message rule.

In other embodiments, the operations of the wireless terminal component may comprise activating the main processing unit according to the message rule such that the main processing unit is activated less than without the message rule.

In some embodiments, the operations of the wireless terminal component may comprise analyzing the characteristics of the sub-system and main processing units and generating the message rule based on the analyzing, the received application instructions and the predefined conditions and actions such that the message rule optimizes the use of the main processing unit according to the analyzed characteristics of the sub-system and main processing units.

In further embodiments, the operations of the wireless terminal component may comprise detecting a pattern of content of the wireless messages defined by the application instructions and the predefined conditions and actions and selectively providing wireless messages to the main processing unit according to a message rule developed for the detected pattern.

In some embodiments, the sub-processing unit consumes less than 4% of the power as the main processing unit. In other embodiments, the sub-processing unit may consume less than 3%, 2% or 1%.

Other devices, methods, and/or computer program products according to embodiments of the invention will be or become apparent to one with skill in the art upon review of the following drawings and detailed description. It is intended that all such additional devices, methods, and/or computer program products be included within this description, be within the scope of the present invention, and be protected by the accompanying claims. Moreover, it is intended that all embodiments disclosed herein can be implemented separately or combined in any way and/or combination.

DETAILED DESCRIPTION

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" may take the form of digital circuitry, such as computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Frequent activation of the main CPU for wireless sensor and/or tag message processing enacts great costs on the battery of a wireless terminal. Existing sub-systems handle only internal sensor messages, are too inflexible, or involve complicated layers of programming over the sub-system and sensors.

The embodiments described herein provide for a solution where pre-defined conditions and actions of the sub-system are utilized by an application to determine the handling of the wireless sensor messages and/or the wake-up policy for the main CPU. Although wireless sensor messages are described in the embodiments below, the embodiments may also apply to wireless messages from ID tags, or other sources of wireless messages, such as other unpaired wireless messages. In the sub-system, conditions may be pre-defined and actions or functions may be pre-defined for processing messages for the main CPU and/or activating the main CPU. They may be hardcoded in the sub-system by the device manufacturer or in the firmware of the sub-system. The conditions and actions may be updated by software upgrades to the device, but they are distinguished from the application instructions received through or from application programming interfaces (APIs). The application instructions may include logic that will use certain pre-defined conditions and actions that preexist in the rules engine. In some cases, application instructions may include a table of identified conditions and actions.

Having simple pre-defined conditions and actions with defined capabilities may provide more of a guarantee against sub-system crashes. The sub-system of the embodiments is also more flexible in that application instructions through smartphone and/or tablet APIs may utilize the pre-defined conditions and actions of the sub-system to perform different actions on wireless sensor messages to more effectively reduce power consumption by the main CPU. Such sub-systems may also decrease latency in the communication with the external device. Time-critical and non-time-critical messages may be processed in a safe but flexible manner according to application instructions for the predefined conditions and actions. Example applications include applications for wireless ID tags, connect requests from other devices, wireless bulletin boards, etc. In some embodiments, the main CPU and subsystem CPU architecture may be analyzed to adapt the message handling policy in runtime.

Sub-systems that process messages by pre-defined conditions and actions may have an advantage in that messages may be processed for sensor or other devices that the portable device does not have control over. For example, paired connections require some type of setup that creates a controlled connection. However, unpaired connections, using wireless sensors from various vendors, locations or circumstances, may not provide the same control as a paired connection.

Some embodiments may describe sub-systems that handle incoming messages from external sensors, but such messages are not limited to sensors. Tags may also provide wireless messages. Tags may include separate devices that provide wireless messages are not necessarily limited to ID tags. Other embodiments may describe sub-systems that handle outgoing messages to sensors and/or controlling devices in a power efficient way.

In many applications, it is not required to process sensor data at the same instant it is received. In some cases, a broadcast can be stored in a memory to be processed at a later point in time. Some low power radio protocols still need the main CPU to be activated directly when the packet is received. Connections which involve advanced pairing between the accessory and phone, applications where real-time responses are required and/or where advanced data processing is required to feed the protocol may not be suitable for buffering for later processing. Therefore, a low power CPU sub-system can be used to handle simple radio connections from ANT and BT LE. The sub-system must be able to determine which packets can be stored and processed at a later time and which must involve the main CPU for instant processing. This can in most cases be determined on a low level in the radio protocol stack based on packet and channel type.

According to some embodiments, communication between the main CPU and the CPU sub-system may be event based or polling based. In a polling based scenario, the main CPU will process packet data on request by the sub-system. In an event based solution, the main CPU or instructions for the sub-system CPU may define under which circumstances the sub-system should trigger the main CPU to process the stored packages. The trigger can be based on a number of packages stored, a time since last read-out, a type of packet, whether the packet originates from a new broadcaster and/or some value or indicator in the packet data. Other example triggers include triggers based on a state of other internal sensors of the portable device, triggers based on a state of the main CPU (e.g., dependent on other independent tasks performed by the device), triggers to forward on the messages based on whether the main CPU is already running and/or triggers based on a sequence of previous messages (e.g., to handle detection of a pattern).

The amount of computation that can be handled by the sub-system may be a trade-off between complexity (power consumption) of the sub-system and the amount and frequency of work performed by the main CPU. The difference in power consumption between a sensor sub-system and main CPU can be between 25-100 times (e.g., less than 4%, 3%, 2% or 1%) depending on the design. For Bluetooth LE, many of the advertisement packets of a connection-less (ADV_NONCONN_IND) communication can be pre-processed and stored by the sub-system. A general task of the subsystem may be to determine if the specific package can be stored for later processing (by the main CPU) and then store it. Regarding the ANT protocol, many connections are connection-less which, depending on the application, can be stored for later processing by the main CPU.

Some connected protocols may also be suitable for handling in the sub-system. Some of the known connections, such as connections between phones and sensor accessories that have been paired previously, could be automatically setup by the sub-system. Even the sensor data could automatically be requested over the connected data channel and stored by the sub-system for later access by the main CPU.

In general, many applications where data is uni-directed (sensors are the typical case) are well suited for a simple protocol using mostly uni-directed connectionless communication. Creating a power efficient sub-system to handle reception of high frequency packages adds to the advantages of using this simple protocol.

Some embodiments described herein are more flexible than completely hard coded application profiles defined in, for example, the Bluetooth® stack. Such embodiments may instead have a rules engine with predefined conditions, actions and functions for processing messages in a general way. Such embodiments may still allow for Android™/IOS® applications to handle most of the application logic by using the pre-defined conditions, action and/or functions.

Various embodiments may be practiced with external sensors or devices coupled to a communications network. A portable electronic device or a mobile terminal may be, for example, a single or dual mode cellular radiotelephone with or without a multi-line display; a Personal Communications System (PCS) terminal that may combine a cellular radiotelephone with data processing, facsimile and data communications capabilities; a Personal Data Assistant (PDA) that can include a mobile terminal, pager, Internet/intranet access, Web browser, organizer, calendar and/or a global positioning system (GPS) receiver; tablet; and a conventional laptop and/or palmtop receiver or other appliance all of which include a radiotelephone transceiver. While it is generally described herein that sensors or tags may be mobile, it will be understood that the sensors, tags and/or other devices may also be non-mobile devices.

It will be understood that wireless terminals according to the embodiments may operate in any type of wireless communications network. In some embodiments, for example, the network may provide services broadly labeled as PCS (Personal Communications Services) including advanced digital cellular systems conforming to standards such as IS-136 and IS-95, lower-power systems such as DECT (Digital Enhanced Cordless Telephone), data communications services such as CDPD (Cellular Digital Packet Data), and other systems such as CDMA-2000, that are proposed using a format commonly referred to as Wideband Code Division Multiple Access (WCDMA).

Figure 1A:
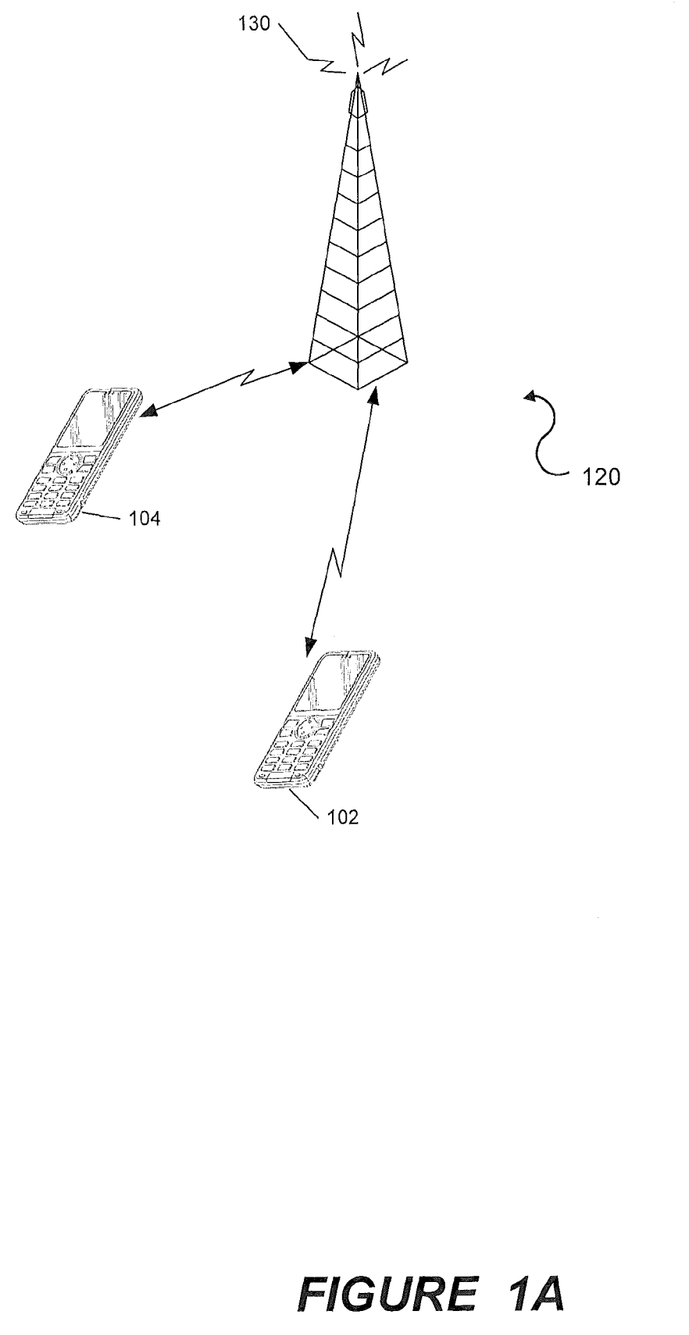
FIG. 1A is a schematic illustration of a wireless communications network that provides service to mobile terminals according to various embodiments of the invention.

FIG. 1A is a schematic illustration is provided of a wireless communications network 120 that provides service to portable electronic devices 102-104, according to various embodiments of the disclosure. It will be understood that portable electronic device 100 as described herein may refer to any one of the portable electronic computing devices 102, 104, or another portable electronic device such as a wireless terminal. The wireless communications network 120 may include a base station transceiver 130 (e.g., a cellular base station).

Figure 1B:
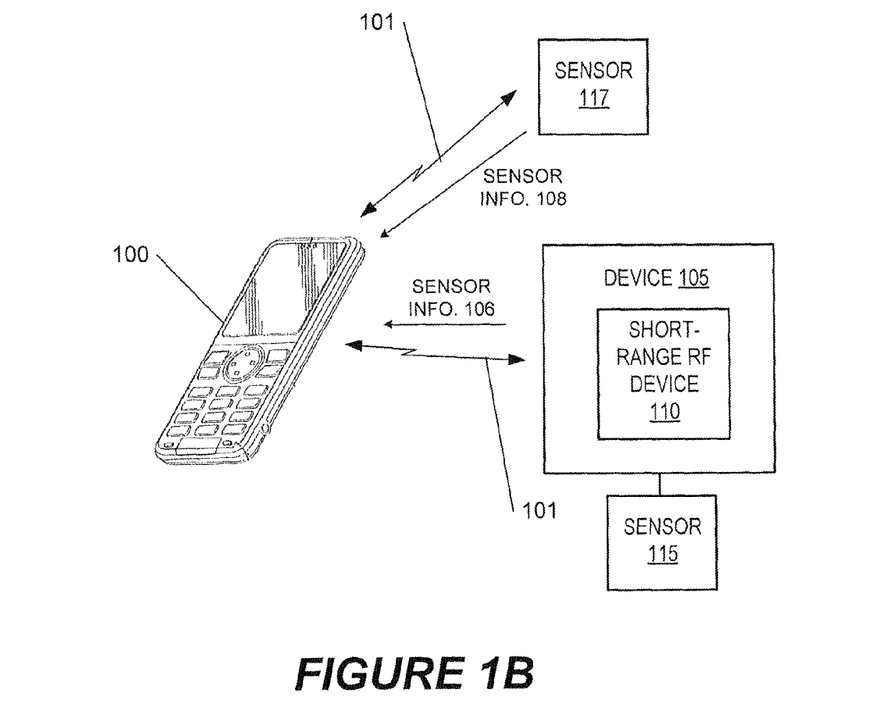
FIG. 1B is a schematic block diagram that illustrates communication between mobile terminals and sensors according to various embodiments.

Referring now to FIG. 1B, an illustration is provided of a portable electronic device 100 and a short-range Radio Frequency (RF) device 110 that may communicate with each other through a short-range RF wireless communication link 101, according to some embodiments. Moreover, it will be understood that the short-range RF wireless communication links 101 may be used as bidirectional links or unidirectional links. The short-range RF device 110 may transfer messages that identify the short-range RF device 110 or sensor 115 using a short-range RF communication protocol via the short-range RF wireless communication link 101. The short-range RF device 110 may optionally transfer sensor information 106, which may be generated by a sensor 115 associated with the short-range RF device 110. Sensor 115 may also transfer sensor information 106 directly. In some cases, sensor 117 may transmit sensor information 108 directly through another communication means.

The sensor information 106 may include sensor data and/or identification information that can uniquely identify a sensor or tag and, thus, any object associated with the sensor or tag. For example, two different objects can have respective tags that each store different identification information that can be used to distinguish two objects.

As illustrated in FIG. 1B, the short-range RF device 110 is associated with the device 105. For example, the short-range RF device 110 may be a Bluetooth tag, an ANT tag, or another tag (e.g., another smart tag) near or attached to the device 105. The sensor 115 may be attached to or near the device 105 and may obtain information about the device 105, such as the operational state of the device 105, and/or may collect environmental data, such as data regarding weather conditions or nearby people or objects, etc. It will be understood, however, that the types of information collected by the sensor 115 may include various categories of information. Moreover, it will be understood that the device 105 associated with the short-range RF device 110 and the sensor 115 may be one of various devices, such as a lock (e.g., a door lock), personal exercise device, vehicle, apparel, a thermostat, a vending machine, a product, a digital display, a light (e.g., a light inside or outside of a home, a traffic light, or a street light), among many other examples.

Referring still to FIG. 1B, the portable electronic device 100 may forward (e.g., relay) the sensor information 106 and/or the identification information received from the short-range RF device 110 to another computing device. Sensor information 106 may additionally or alternatively be forwarded by a fixed electronic device, such as an electronic device that is fixed to or near the device 105. The fixed electronic device may communicate with a server via wireless communications and/or via a wired connection such as a fixed Ethernet connection. For example, the fixed electronic device may be a fixed sensor on a device or exercise equipment and may use an Ethernet port to access a cloud service that provides services.

Figure 2:
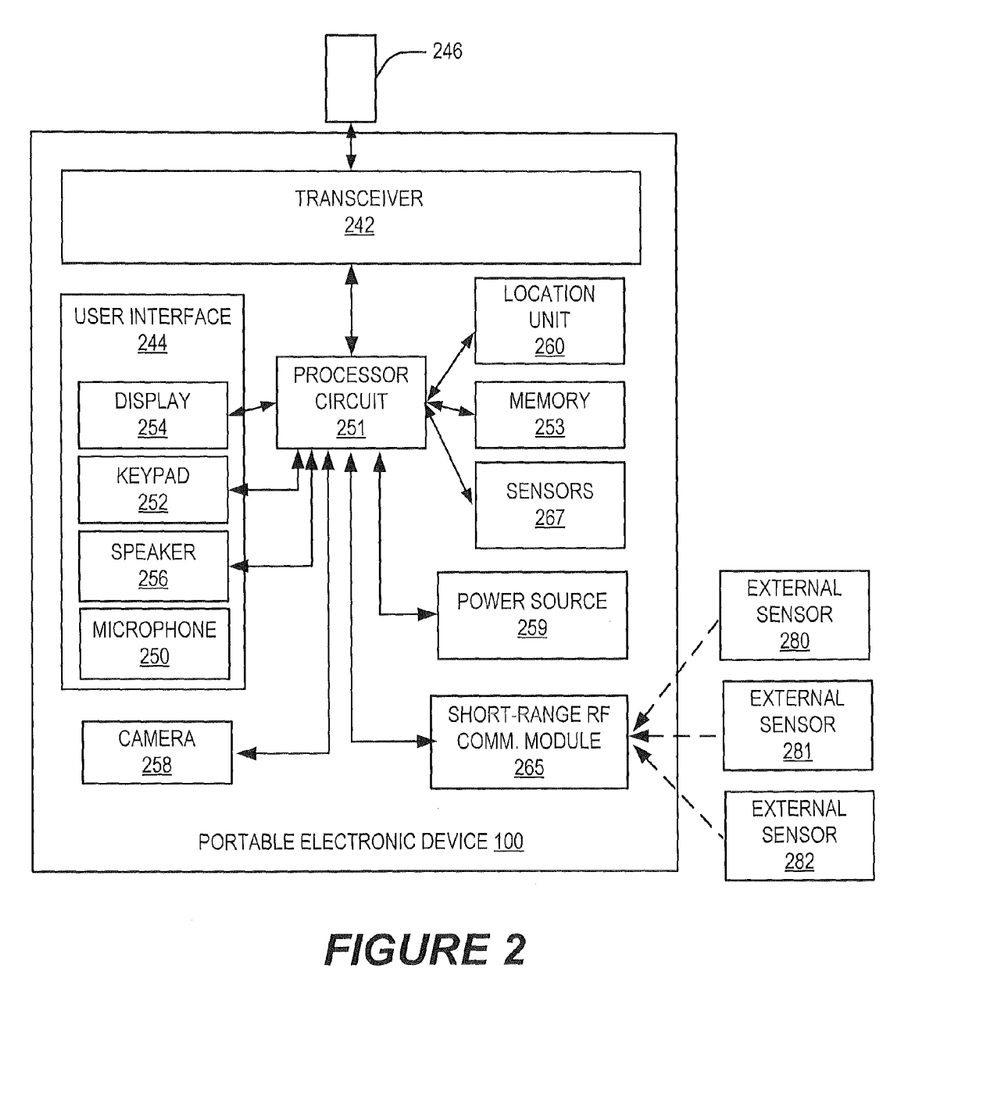
FIG. 2 is a block diagram that illustrates a wireless terminal according to various embodiments.

FIG. 2 is a block diagram illustrating a portable electronic device 100, according to various embodiments. The portable electronic device 100 may be any of a variety of portable electronic devices. For example, the portable electronic device 100 may be a mobile or wireless terminal (e.g., a mobile telephone), a portable audio player, a portable video player, a camera, an electronic reading device, a tablet, portable exercise monitor, or a portable computer (e.g., a tablet computer, a netbook computer, or a laptop computer).

As illustrated in FIG. 2, a user interface 244 of the portable electronic device 100 may include a keypad 252, a display 254, a speaker 256, and a microphone 250, operations of which are known to those of skill in the art. It will be understood that the functions of the keypad 252 and the display 254 can be provided by a touch screen through which the user can view information, such as computer displayable documents, provide input thereto, and otherwise control the portable electronic device 100.

The components of portable electronic device 100 may communicate with processor circuit 251. A processor circuit 251 provides for overall operation of the portable electronic device 100 including coordination of communications via the transceiver circuit 242, the user interface 244, and other components included in the portable electronic device 100. The processor circuit 251 may be implemented using a variety of hardware and software. For example, operations of the processor circuit 251 may be implemented using special-purpose hardware, such as an Application Specific Integrated Circuit (ASIC) and programmable logic devices such as gate arrays, and/or software or firmware running on a computing device such as a microprocessor, microcontroller or digital signal processor (DSP). The processor circuit 251 may provide digital signal processing operations such as scanning for an acceptable control channel, camping on a control channel (including maintaining synchronization with the base station that communicates with the portable device 100), Voice Activated Dialing (VAD) services, performing media operations and the like.

According to some embodiments, the processor circuit 251 may include any microprocessor and low-power microprocessor that coordinate with each other for portable electronic device applications. The processor circuit 251 can process sensor signals received from external sensors 280-282 through short range communication module 265.

The transceiver 242 may include a transmitter circuit and a receiver circuit, which may cooperate to transmit and receive RF signals via an antenna 246. The antenna system 246 may include an antenna feed structure and one or more antennas. Although FIG. 2 illustrates that a portion of the antenna 246 extends beyond the housing of the portable electronic device 100, in various embodiments, the antenna 246 may not be visible to a user of the portable electronic device 100 and/or may not protrude from the housing of the portable electronic device 100. According to various embodiments, the transceiver 242 of the portable electronic device 100 may be configured to operate in any of the following bands: Advanced Mobile Phone Service (AMPS), ANSI-136, Global System for Mobile Communications (GSM), Third Generation Partnership Project (3GPP) Long Term Evolution (LTE), General Packet Radio Service (GPRS), enhanced data rates for GSM evolution (EDGE), Digital Communications Services (DCS), Personal Digital Cellular (PDC), Personal Communications Services (PCS), Code Division Multiple Access (CDMA), wideband-CDMA, CDMA2000, and/or Universal Mobile Telecommunications System (UMTS) frequency bands. Other bands can also be used in other embodiments. Also, various embodiments may be compatible with Long Term Evolution (LTE) and/or High Speed Packet Access (HSPA) standards. Additionally or alternatively, in some embodiments, the portable electronic device 100 may be configured to use Global Positioning System (GPS) and/or Wireless Local Area Network (WLAN) frequency bands. Other communication protocols may include, but are not limited to, Bluetooth, ANT, RFID, and/or WLAN (e.g., 802.11a, 802.11b, 802.11e, 802.11g, and/or 802.11i).

The memory 253 may be a general purpose memory that is used to store both computer readable program instructions for the processor circuit 251, as well as data, such as audio data, video data, message data, sensor data, configuration data, and/or other data that may be accessed and/or used by the processor circuit 251. The memory 253 may include a nonvolatile read/write memory, a read-only memory, and/or a volatile read/write memory. In particular, the memory 253 may include a read-only memory in which basic operating system instructions are stored, a nonvolatile read/write memory in which re-usable data, such as configuration information, directory information, and other information may be stored, as well as a volatile read/write memory, in which short-term instructions and/or temporary data may be stored. In various embodiments, the memory 253 may include a removable nonvolatile memory card. Memory 253 may include a memory for each of a main processing circuit and a sub-system processing circuit.

The portable electronic device 100 further includes a short-range RF communication module 265 that may be configured to operate in one or more modes to forward information to and/or from external sensors 280-282. The short-range RF communication module 265 is operatively coupled to the processor circuit 251 and can operate under the control of the processor circuit 251. The short-range RF communication module 265 is configured to receive sensor messages using a short-range wireless transmission protocol even when the portable electronic device 100 does not have any knowledge of the source of the sensor signal. The portable electronic device 100 may receive and transmit sensor signals over a wide area cellular network communicatively coupled to the portable electronic device 100, such as through the base station transceiver 130.

A tag and/or sensor can be attached to moveable objects and may be any shape/size that can be incorporated into/on the moveable objects. The moveable objects can be wallets, keys, mobile telephones, clothing, personal activity devices, automobiles, consumer products, equipment and may even be included in printed inks on, for example, paper. Other moveable objects can also incorporate tags and/or sensors. The range of the short range wireless transmission protocol and supporting devices assures that any such objects are within a close proximity of the device 100 at the time of receipt of sensor information.

Information stored in a sensor or tag can be identification (ID) information that can uniquely identify the sensor. For example, two different moveable objects can have respective sensors or tags that each store different ID information that can be used to distinguish the two moveable objects. It will be understood that the interface circuit 265 includes an antenna (not shown) via which the short range wireless signals are received. The short range antenna can be included in the antenna system 246 or can be a separate structure (internal or external).

According to various embodiments, the portable electronic device 100 and the short-range RF device 110 may be different types of devices. For example, the portable electronic device 100 may be a battery-powered device (e.g., the power source 259 may include a battery), and the short-range RF device 110 may not be battery-powered, but rather may receive power from an external source (e.g., from signals transmitted by the portable electronic device 100). Accordingly, the power source 259 of the portable electronic device 100 may power the short-range RF device 110 through magnetic coupling.

In some embodiments, the location unit 260 is a Global Positioning System (GPS) location circuit, including a GPS receiver circuit, that uses, for example, any available GPS or assisted GPS based location approach in conjunction with a GPS satellite system. Such approaches are commonly referred to as assisted-GPS, which is defined, for example, in specification numbers 3GPP TS 04.31, 3GPP TS 03.71 and 3GPP TS 04.35.

In other embodiments, the location unit 260 is a network location circuit that uses location information provided by the network 120, such as a base station ID for the base station 130 servicing the device 100 that has location information associated therewith. In some other embodiments according to the invention, the location unit 260 is a local area network location circuit that uses location information provided via the local wireless network (through a local wireless interface circuit not shown) to determine the location information for the mobile terminal. Other location determination approaches may be used. In some embodiments, the local area network is a WLAN compliant network. In other embodiments, the local wireless network is a Bluetooth compliant interface. In any event, the local wireless network can be used to provide information to the location unit 260 to determine the location information for the device 100.

Figure 3:
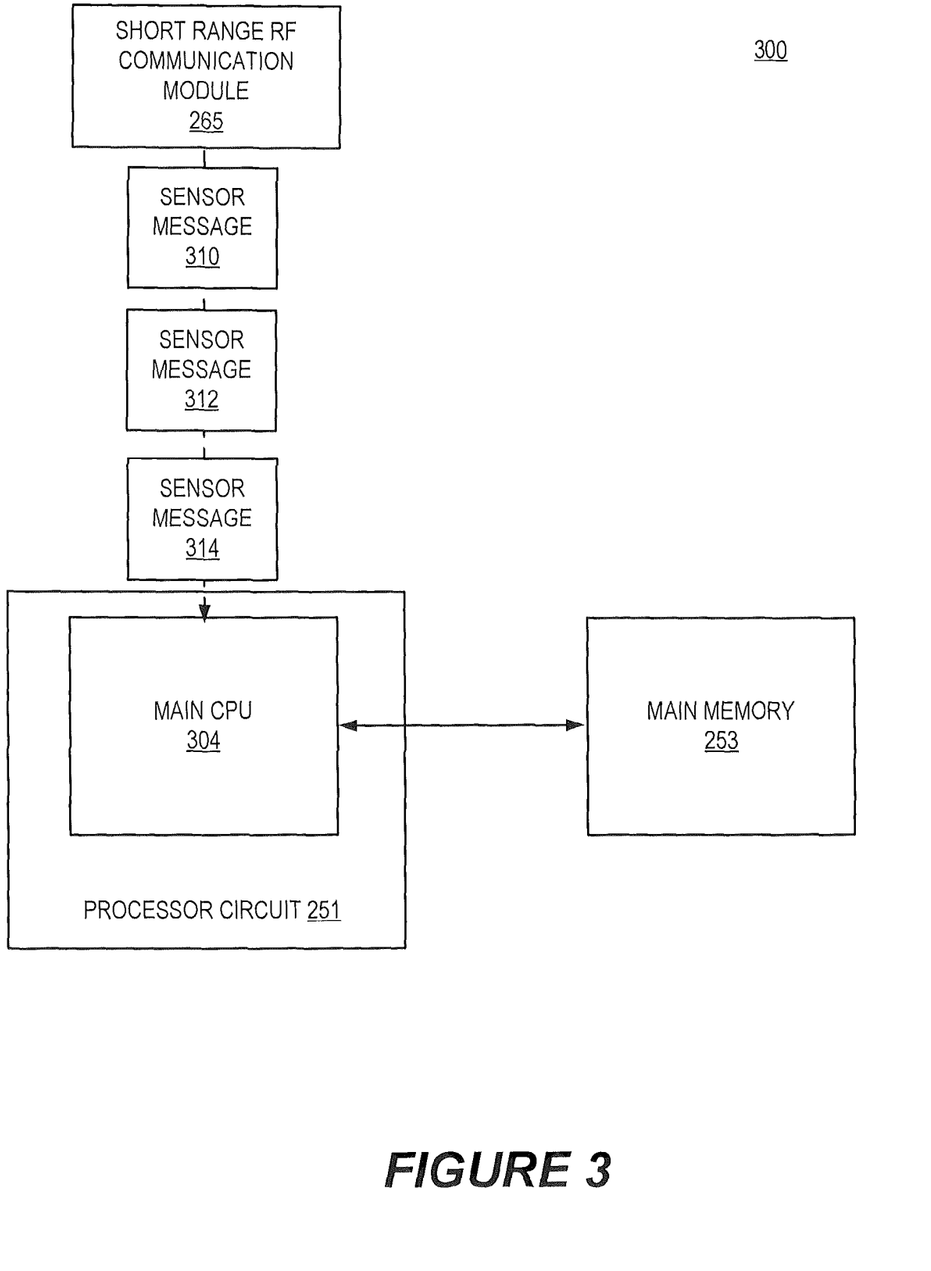
FIG. 3 is a block diagram that illustrates operations of a low-range radio component.

FIG. 3 is a block diagram that illustrates a system 300 for processing sensor signals 310, 312 and 314 received by communication module 265. Sensor signals 310, 312 and 314 are transmitted directly to main CPU 364 of processor circuit 251 from communication module 265. Main CPU 304 is coupled to main memory 253. As shown in FIG. 3, all sensor messages received by communication module 265 are sent to main CPU 304 for processing at the time of receipt by communication module 265. The frequent use of main CPU 304 consumes a great amount of power.

Figure 4:
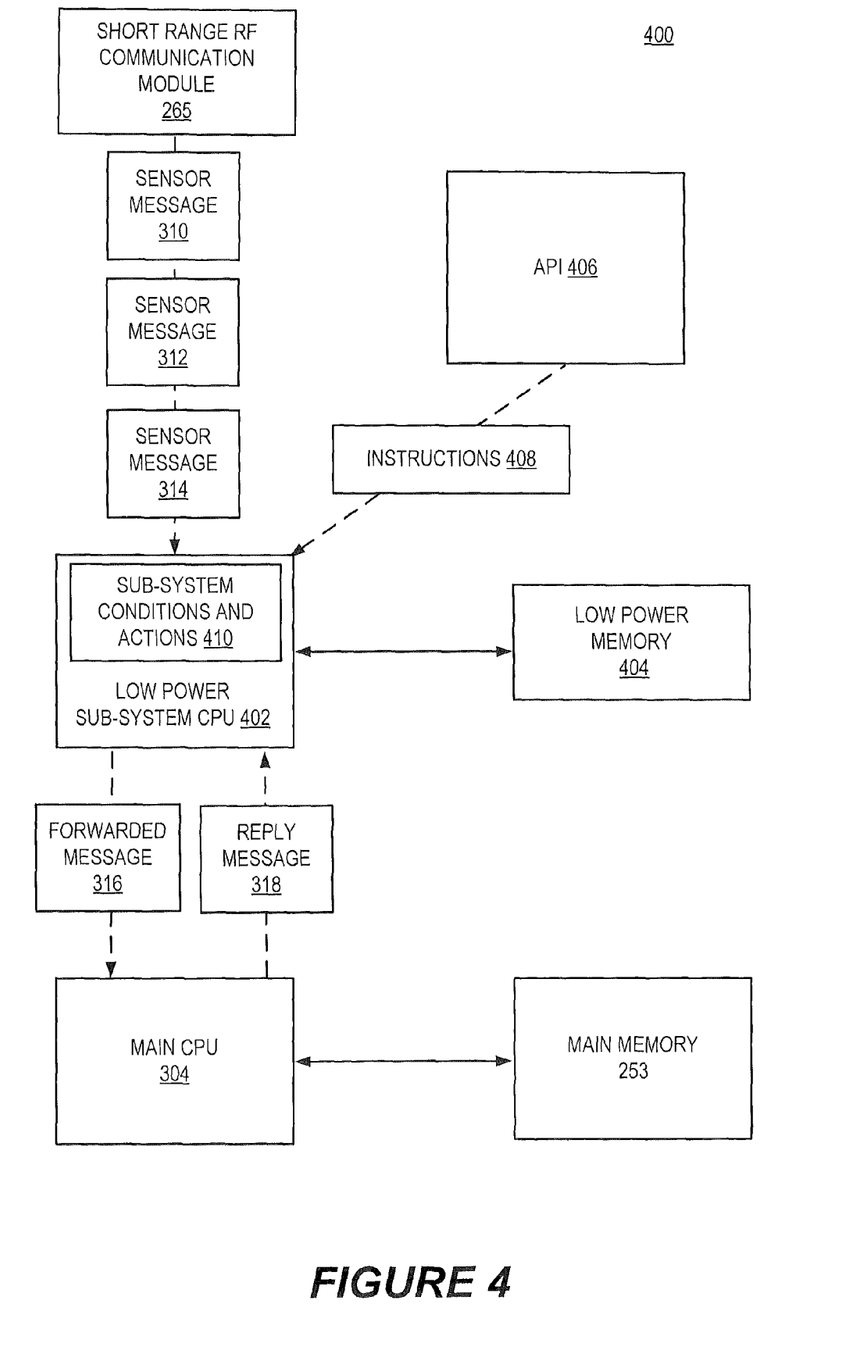
FIG. 4 is a block diagram that illustrates operations of a sub-system processing unit according to various embodiments.

FIG. 4 is a diagram that illustrates a system for more-efficient message processing, according to some embodiments. Sensor messages 310, 312 and 314 are received by low power sub-system CPU 402. Sub-system CPU 402 stores pre-defined conditions and actions 410 for processing wireless messages and interacting with main CPU 304. Sub-system CPU may operate with a low power memory 404.

Figure 5:
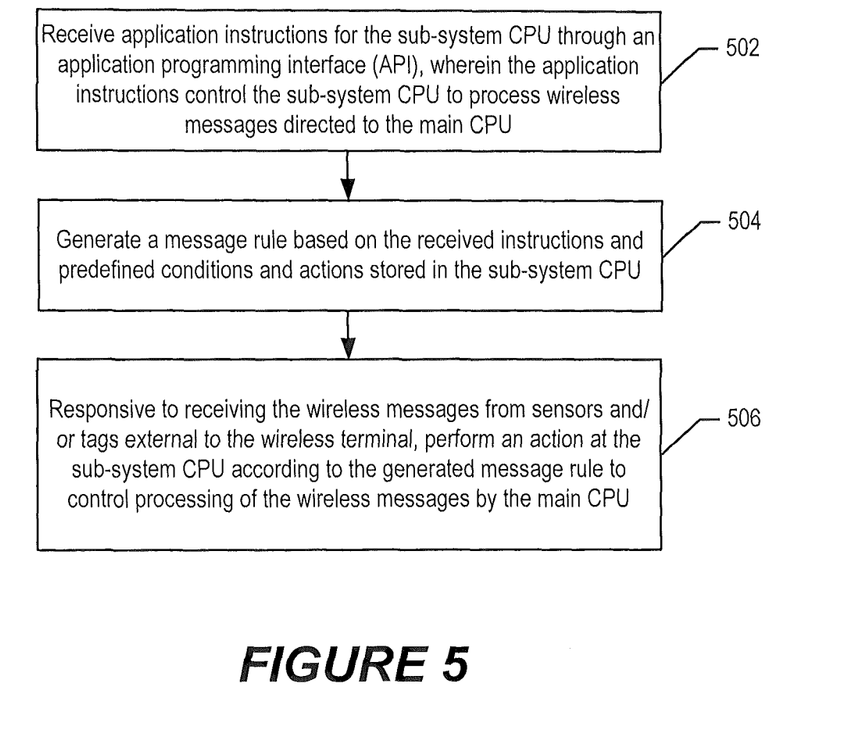
FIG. 5 is a flowchart that illustrates a method for processing wireless messages according to various embodiments.

FIG. 4 will be discussed with reference to FIG. 5, which illustrates a flowchart of a process for more efficient wireless sensor/tag message processing, according to some embodiments. At block 502, application instructions for the sub-system CPU are received through an API. The application instructions control the sub-system CPU to process wireless sensor/tag messages directed to the main CPU.

In an example, a user of a portable electronic device 100 comprising system 400 may download and/or install an application that utilizes external sensors, such as sensors 280-282. The application may provide application instructions 408 to sub-system CPU 402 through an API 406. Application instructions may provide the logic for use of the defined message handling and CPU activation functions that are part of the sub-system hardware and software architecture. In some cases, the application may reside on main CPU 304.

A message rule is generated based on the received instructions and predefined conditions and actions stored in the sub-system CPU (block 504). Message rules are the affirmative instructions of the sub-system for handling messages and for interacting with the main CPU. The message rules may be the selected pre-defined conditions and actions of the sub-system that the application will use and/or the pre-defined conditions and actions of the sub-system modified or completed with parameters and logic provided by the application instructions. The pre-defined conditions and actions may be simple conditions and/or filters. Such filters may ask for parameters or values that are provided by the application instructions. The resulting message rules will be flexible but will be based on simple rules that will prevent module crashes. Some message rules may be functional enough to choose actions to perform based on the content of the messages.

Applications may be downloaded. Application instructions may be received when the device 100 is activated and receiving messages. Application instructions may be received through an API during runtime or while the main CPU is running. Application instructions may come from the cloud, or a cloud application via an application on the phone. Application instructions may be received from an application that a user downloaded from a mobile application store or repository. Application instructions may be kept between re-boots of the phone.

Continuing the previous example, instructions 408 may utilize the pre-defined sub-system conditions and actions 410 to more precisely manage the processing of the wireless sensor messages 310-314 of the external sensors 280-282. The instructions 408 may reflect knowledge of the operation of the sensors 280-282 and the requirements of an application installed on device 100 that utilize signals from the sensors 280-282.

Responsive to receiving wireless sensor messages from external sensors and/or tags, an action is performed by the sub-system CPU 402 according to the generated message rule (block 506). The generated message rule may control processing of the wireless sensor messages 310-314 by the main CPU 304. This may mean reduced processing and/or power consumption by the main CPU 304.

This customization of the processing of messages 310-314 may provide for more efficient use of main CPU 304. For example, a third party application may register filter conditions through API 406 to select the type of message that is of interest for the application. The logic of instructions 408 may utilize pre-defined filtering conditions in sub-system conditions and actions 410 to forward message 316 and activate main CPU 304 once over a period of time, rather than forward all three sensor messages 310-314 and possibly activating main CPU 304 three times. In some cases, message rules may perform actions based on the state, operation or activity of the main CPU 304. In other cases, the main CPU 304 may send a reply message 318 to the sub-system CPU 402.

Figure 6:
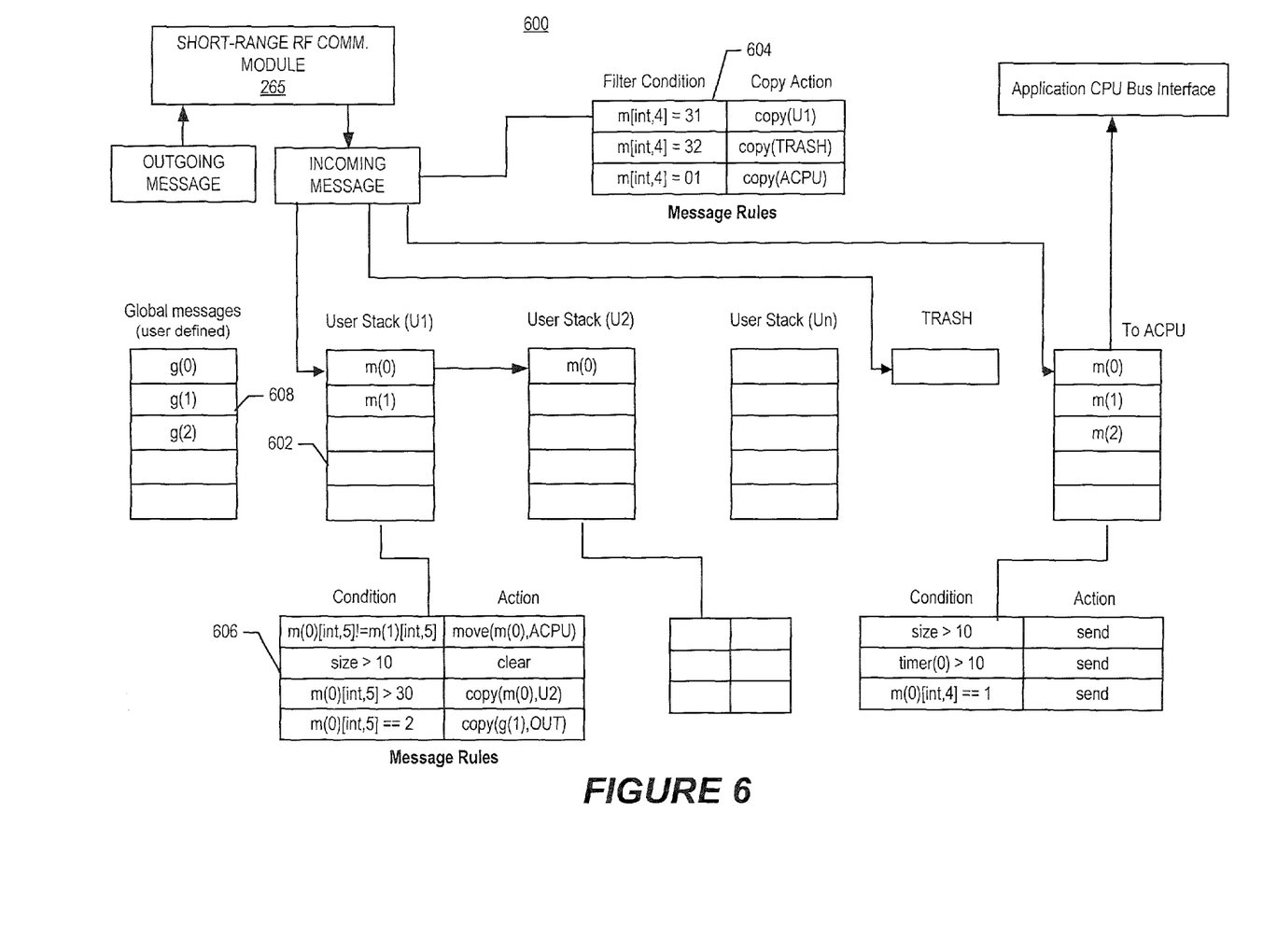
FIG. 6 is block diagram that illustrates a system for processing wireless messages according to various embodiments.

The application may also use the API 406 for instructions to generate user defined stacks and message rules, such as in an associated table of conditions and actions. These stacks, such as stack 602, and tables 604-606 are shown in FIG. 6, according to some embodiments. Tables 604 and 606 include message rules generated from the application instructions sent from the application. The global messages (g(0), g(1) . . . ) in stack 608 are also set up from instructions from the application. Example message rules on the "To ACPU" buffer may include "gps(on)→send" and "main_cpu(on)→send".

In another example, to handle a gesture, a gesture detection function may be pre-defined (which operates on a specific buffer) in the sub-system CPU 402. Unlock_gesture may be a complex pre-defined function that knows a lot about the type of messages in the buffer. g(0) may, in this case, be a specific message that has been setup from the application which is used to indicate the detected gesture (without sending all individual messages in the buffer). A resulting message rule may be "unlock_gesture→move(g(0),ACPU)".

According to some embodiments, incoming messages may be evaluated by filter conditions. Filtered messages may be copied to a corresponding target buffer, such as stack 602. The current incoming message is overwritten by the next message. Messages copied to stack 602 trigger the message rule table 606 to be evaluated. The buffer rules or conditions are evaluated and a corresponding action is performed. In a stack, elements may enter at the top (existing elements move down one step). Access to all stack elements may be available through its index number in the stack.

User defined messages (global messages) can be defined through the API. The global messages can be used in actions on a user stack. An outgoing register can be defined to send a message on the radio. This functionality may allow a pre-defined message to be sent if a specific message is received on the radio. This allows the sub-system to independently handle simple two-way communication.

Actions that may be performed according to generated message rules may include sending messages in the Application CPU (ACPU) stack to the ACPU, which may be main CPU 304. Elements may move from one stack to the top of another stack, deleting the source element. Elements may be copied from one stack to the top of another, leaving the source element. Elements may also be cleared from a stack.

In the embodiment shown in FIG. 6, m(0) indicates a first message in the stack. The label m(3)[int, 5] indicates the message at index 3 in the stack and the integer at position 5 in that message. The label move(m(0), ACPU) indicates moving message at index 0 of current stack to the top of the ACPU stack and deleting the message in the current stack. The "size" is the number of elements in a stack. The "timer" indicates that an application can register timers that can be used in the conditions.

Consider the condition: "m(0)[int,5]!=m(1)[int,5]". The !=(not equal to) operator is pre-defined and the buffer accessor function m(1)[5] is also pre-defined. However, the whole condition "m(0)[int,5]!=m(1)[int,5]" (i.e. selection of accessor functions and !=operator and parameters 0, int, 5, 1, int, 5) is a message rule based on an instruction received from the application. As another example, the condition "size >10", the function size and the > operator are pre-defined, but the whole condition "size >10" is received from the application (as part of the instructions).

As for actions, the operation move(<any elem>, <any buffer>) is pre-defined, but the index to "elem" and the actual buffer is sent as part of the application instructions. In some embodiments, application instructions may specify the conditions and actions as strings (short strings of code) which are parsed and validated by the application and sent in some intermediate format to the sub-system to generate message rules.

In some embodiments, the cost of waking up the main CPU compared to buffering the message in the subsystem may be indicated by a power consumption ratio. Other ratios may be based on power consumption of the main CPU to power consumption of the sub-system CPU. Messages may be forwarded based on the ratio. For example, a main CPU/buffering ratio of 100:1 causes the sub-system to forward messages every 5 seconds while a ratio of 50:1 causes the sub-system to forward messages every 3 seconds. In some cases, this interval may increase or decrease if it is determined that the CPU is active for other reasons. Actions may also be determined based on generated message rules that determine whether a battery charger is inserted or analyze the battery level.

In some embodiments, message rules may determine if other dependent sensors are accessible from the communication sub-system. For example, data could be sent every 5 minutes if no GPS is available, but every 10 seconds if GPS is available.

Other actions may be performed according to other embodiments. Messages may be discarded, perhaps if they are duplicative, cumulative or do not contain useful information such as location information. Actions may wake the main CPU. In further embodiments, operations may comprise activating the main processing unit according to the message rule such that the main processing unit is activated less than without the message rule.

In other embodiments, messages may be sent to the sensors in reply to incoming messages.

In some embodiments, the contents of the message may be modified, increased or reduced before forwarding. In some embodiments, the method may comprise modifying a wireless sensor message based on content of the wireless sensor message and providing the modified wireless sensor message to the main processing unit such that the main processing unit performs less processing of the wireless sensor message than if the wireless sensor message was not modified.

In some cases, several messages are summarized in one message. For example, a mean value of several values in messages may be determined and only the mean value is sent at a more infrequent interval. In some embodiments, operations may comprise summarizing content of a plurality of the wireless sensor messages into summarized content in a summarized wireless sensor message, providing the summarized wireless sensor message to the main processing unit and discarding the remaining wireless sensor messages of the plurality of wireless sensor messages such that the remaining wireless sensor messages are not provided to the main processing unit.

In some embodiments, the content in several messages may be included in a rule. A pattern may be defined (relative differences between messages, gesture from multiple touch events, etc.) for a message rule. The message rule may look for or require several messages to match the pattern before further action is taken. Another example rule may involve determining a minimum change from a previous message. For instance, a new temperature reading message is not sent to the main CPU if the temperature has not changed at least one degree.

In some embodiments, operations may comprise detecting a pattern of content of the wireless sensor messages defined by the application instructions and the predefined conditions and action. Wireless sensor messages may then be selectively provided to the main processing unit according to a message rule developed for the detected pattern.

In some embodiments, a message rule may perform an action based on a determination of resource constraints of the sub-system. For example, messages may be forwarded or discarded when the size of the message buffer is over a certain limit. In other embodiments, operations may comprise analyzing the characteristics of the sub-system and main processing units and generating the message rule based on the analyzing. The received application instructions and the predefined conditions and action such that the message rule optimizes the use of the main processing unit according to the analyzed characteristics of the sub-system and main processing units.

In some embodiments, operations may comprise selectively buffering the received wireless sensor messages in a buffer based on content of the wireless sensor messages and providing the wireless sensor messages from the buffer to the main processing unit for processing based on the buffer reaching a threshold level.

In other embodiments, operations may comprise withholding provision of a wireless sensor message to the main processing unit based on content of the wireless sensor message. The method may comprise withholding provision of a wireless sensor message to the main processing unit when location information of an external sensor that sent the wireless sensor message is not found in the wireless sensor message.

In other embodiments, operations may comprise forwarding wireless sensor messages to the main processing unit at specified times and/or a specified frequency according to the message rule. In some embodiments, operations may comprise filtering the wireless sensor messages according to the message rule to prevent filtered wireless sensor messages from being processed by the main processing unit.

Embodiments described herein may provide for more efficient power consumption. The simple rules of a sub-system may prevent module crashes. The flexibility of the sub-system allows for applications to directly program the use of the defined conditions and actions of the sub-system. Application developers may better manage the use of sensors and portable device resources such as tags.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A computer-implemented method of controlling a sub-system processing unit of a wireless terminal that coordinates processing with a main processing unit of the wireless terminal, the method comprising:
receiving application instructions for the sub-system processing unit through an application programming interface (API), wherein the application instructions control the sub-system processing unit to process wireless messages directed to the main processing unit;
generating a message rule based on the received application instructions and predefined conditions and actions stored in the sub-system processing unit and based on an operating state of the main processing unit; and
responsive to receiving the wireless messages from sensors and/or tags external to the wireless terminal, performing an action at the sub-system processing unit according to the generated message rule to reduce processing of the wireless messages by the main processing unit.

2. The method of claim 1, further comprising:
selectively buffering the received wireless messages in a buffer based on content of the wireless messages; and
providing the wireless messages from the buffer to the main processing unit for processing based on the buffer reaching a threshold level.

3. The method of claim 1, wherein performing the action comprises:
withholding provision of a wireless message to the main processing unit based on the message rule.

4. The method of claim 3, further comprising:
withholding provision of a wireless message to the main processing unit when location information of a sensor that sent the wireless message is not found in the wireless message.

5. The method of claim 1, wherein performing the action comprises forwarding wireless messages to the main processing unit at specified times and/or a specified frequency according to the message rule.

6. The method of claim 1, wherein performing the action comprises:
activating the main processing unit according to the message rule such that the main processing unit is activated less frequently than without the message rule.

7. The method of claim 1, further comprising:
analyzing the characteristics of the sub-system and main processing units; and
generating the message rule based on the analyzing, the received application instructions and the predefined conditions and actions such that the message rule optimizes the use of the main processing unit according to the analyzed characteristics of the sub-system and main processing units.

8. The method of claim 1, further comprising:
detecting a pattern of content of the wireless messages defined by the application instructions and the predefined conditions and actions; and
selectively providing wireless messages to the main processing unit according to the message rule developed for the detected pattern.

9. The method of claim 1, further comprising:
summarizing content of a plurality of the wireless messages into summarized content in a summarized wireless message;
providing the summarized wireless message to the main processing unit; and
discarding the remaining wireless messages of the plurality of wireless messages such that the remaining wireless messages are not provided to the main processing unit.

10. A wireless terminal component, comprising:
a sub-system processor;
a memory coupled to the sub-system processor and comprising computer readable program code embodied in the memory that when executed by the sub-system processor causes the sub-system processor to perform operations comprising:
receiving application instructions through an application programming interface (API), wherein the application instructions control the sub-system processor to process wireless messages directed to a main processor of the wireless terminal;
generating a message rule based on the received application instructions and predefined conditions and actions stored in the sub-system processor and based on an operating state of the main processing unit; and
responsive to receiving wireless messages from sensors external to the wireless terminal, performing an action according to the generated message rule to control processing of the wireless messages by the main processing unit.

11. The system of claim 10, the operations further comprising:
withholding provision of a wireless message to the main processing unit based on content of the wireless message.

12. The system of claim 10, the operations further comprising:
activating the main processing unit according to the message rule such that the main processing unit is activated less frequently than without the message rule.

13. The system of claim 10, the operations further comprising:
analyzing the characteristics of the sub-system and main processing units; and
generating the message rule based on the analyzing, the received application instructions and the predefined conditions and actions such that the message rule optimizes the use of the main processing unit according to the analyzed characteristics of the sub-system and main processing units.

14. The system of claim 10, the operations further comprising:
detecting a pattern of content of the wireless messages defined by the application instructions and the predefined conditions and actions; and
selectively providing wireless messages to the main processing unit according to the message rule developed for the detected pattern.

15. The method of claim 1, wherein the application instructions are provided by an application residing on the main processing unit.

16. The system of claim 10, wherein the application instructions are provided by an application residing on the main processing unit.

17. The method of claim 1, wherein the predefined conditions and actions stored in the sub-system processing unit comprise a table of identified conditions and actions stored in the sub-system processing unit.

18. The system of claim 10, wherein the predefined conditions and actions stored in the sub-system processing unit comprise a table of identified conditions and actions stored in the sub-system processing unit.

* * * * *